F. H. STEBBINS & W. A. HOPKINS.
FOUR WHEEL TRUCK STEERING MECHANISM.
APPLICATION FILED FEB. 19, 1917.
1,289,296.
Patented Dec. 31, 1918.
2 SHEETS—SHEET 1.
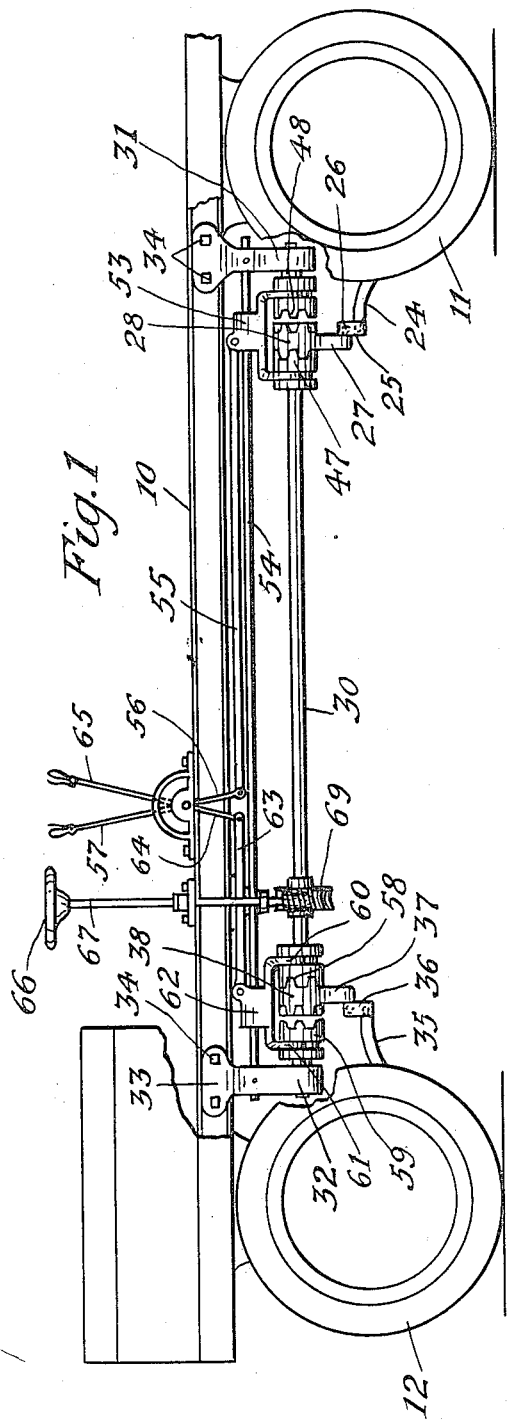
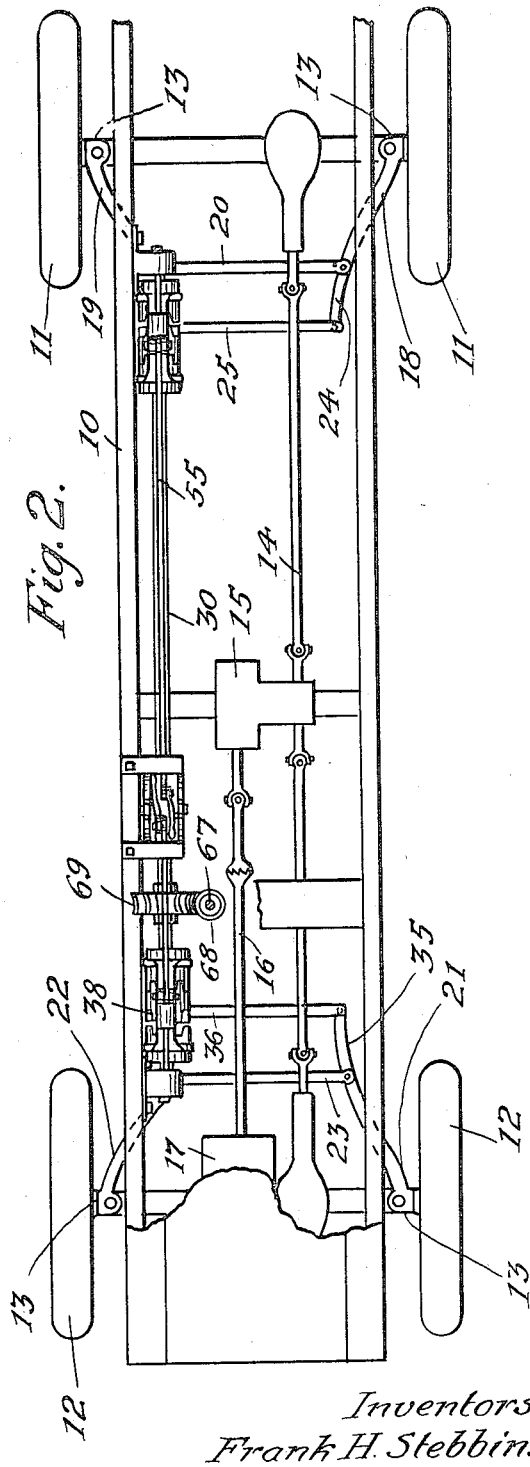
Inventors:
Frank H. Stebbins.
William A. Hopkins
By H. A. Whiteley
their Attorney.

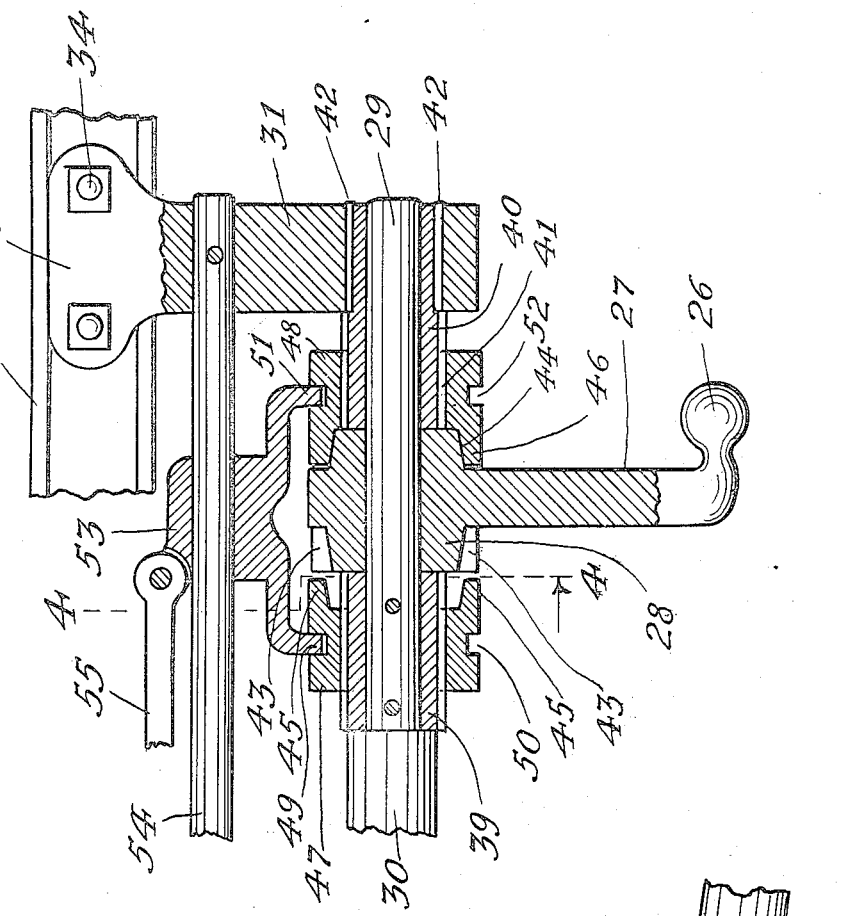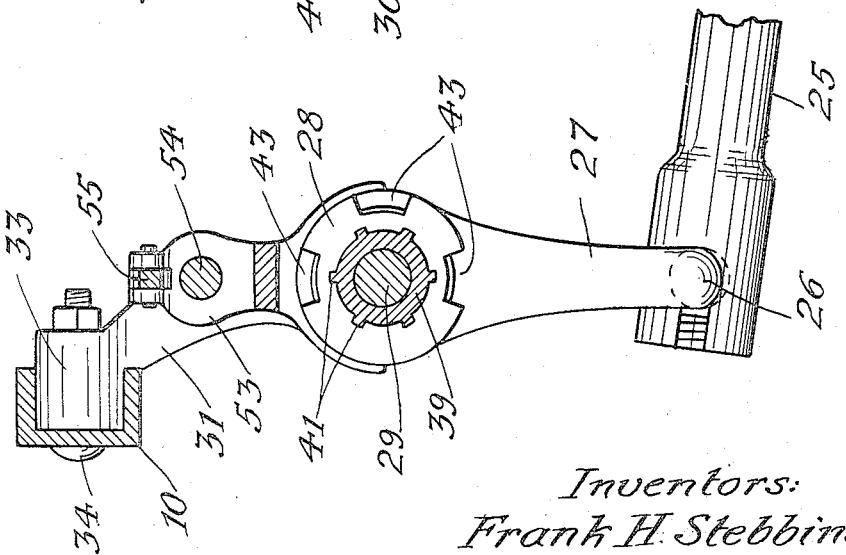

UNITED STATES PATENT OFFICE.

FRANK H. STEBBINS AND WILLIAM A. HOPKINS, OF MINNEAPOLIS, MINNESOTA, ASSIGNORS TO ANTON HUHN, OF MINNEAPOLIS, MINNESOTA.

FOUR-WHEEL TRUCK STEERING MECHANISM.

1,289,296.  Specification of Letters Patent.  Patented Dec. 31, 1918.

Application filed February 19, 1917. Serial No. 149,434.

*To all whom it may concern:*

Be it known that we, FRANK H. STEBBINS and WILLIAM A. HOPKINS, citizens of the United States, residing at Minneapolis, in the county of Hennepin and State of Minnesota, have invented certain new and useful Improvements in Four-Wheel Truck Steering Mechanism, of which the following is a specification.

Our invention relates to steering mechanism for vehicles and has for its object to provide mechanism adapted to steer a vehicle by operating all four wheels simultaneously or to steer the vehicle by operating either of said wheels independently of the other wheels.

In carrying out our invention we mount the front and rear sets of wheels respectively upon steering knuckles of a well-known form, each pair of said knuckles being connected by a link, and in conjunction with such coupled steering knuckles we provide means for simultaneously operating the two sets of wheels in opposite directions for steering purposes combined with means whereby either set of wheels may be independently locked to run parallel with the frame of the automobile and the other set operated for steering purposes independently of the locked set.

The full objects and advantages of our invention will appear in connection with the detailed description thereof and are particularly pointed out in the claims.

In the drawings, illustrating the application of our invention in one form,—

Figure 1 is a side elevation of a truck or four-wheeled vehicle having our invention applied thereto. Fig. 2 is a plan view of such a truck. Fig. 3 is an enlarged sectional view of one of the shiftable clutching devices, the section being taken longitudinally through such device. Fig 4 is a sectional view on line 4—4 of Fig. 3.

Our invention is shown as applied to a truck having a frame 10, one set of wheels 11 and another set of wheels 12, each of said wheels being mounted upon steering knuckles 13, and said wheels (in the embodiment shown) each being driven by means of a driven shaft 16 driven from motor 17. The details of the driving mechanism form no part of the invention of this application and are therefore not further described; and it will be understood that while our steering mechanism is of marked advantage when used in connection with a four-wheel driven vehicle, it may nevertheless be used with marked advantage in a vehicle driven from a pair of wheels in the usual way.

The steering knuckles 13 of the wheels 11 are provided with laterally and inwardly extended arms 18, 19 which are pivotally connected by a link 20. Similarly, the steering knuckles 13 of the wheels 12 are provided with arms 21, 22 pivotally connected by a link 23. Arm 18 has an extension 24 beyond the pivot on the link 20 to which is pivotally connected a link 25. The link 25 is in turn connected by a socket joint with a ball 26 on an arm 27, which, as best shown in Fig. 3, is integral with a clutch hub 28 loose on a reduced portion 29 of a shaft 30 which extends into close proximity to both sets of wheels and is journaled at its ends in hangers 31 and 32 depending from frame 10 to which said hangers are secured by means of blocks 33 entering the frame members 10 and held by bolts 34.

In a similar manner, an extension 35 of arm 21 is connected by a link 36 with an arm 37 on a clutch hub 38, also loose on reduced portion of shaft 30. The hubs 28 and 38 are held positioned on the reduced portions of shaft 30 between a sleeve 39 pinned to such reduced sections and another sleeve 40 rigidly secured in non-rotating relation to hanger 31 (or hanger 32), as best shown in Fig. 3. As best shown in Fig. 4, the sleeves 39 and 40 are provided with lips or flutings as indicated at 41, which flutings on sleeve 40 fit within corresponding portions 42 formed on the walls of the openings in hangers 31 and 32, whereby the sleeves 40 are held rigidly against turning movement within said hangers. The clutch hub 28 is formed with a plurality of end sockets 43 and 44 on opposite sides thereof which are adapted to receive correspondingly-formed teeth 45 and 46 on sleeves 47 and 48 slidably mounted on the sleeves 39 and 40, respectively, and held from turning movement thereon by fluted interior surfaces coacting with the flutings 41 on the outside of sleeves 39 and 40. A fork 49 enters a groove 50 in clutch sleeve 47, and a fork 51 enters a groove 52 in clutch sleeve 48, the two forks being integrally united with a block 53 slidable on a rod 54 extending between and supported by hangers 31 and 32.

The block 53 is pivotally connected by means of a link 55 with the lower end 56 of a hand lever 57. By this means either clutch sleeve 47 or clutch sleeve 48 may be brought so as to have the teeth 45 or 46 thereon enter the notches 43 or 44 on the clutch hub 28. Because of the fact that these notches are unevenly spaced, and of different size, it will be apparent that there will be but one position of clutch hub 28 and arm 27 when clutching engagement of either sleeve 47 or sleeve 48 can be effected. This position will always be such that it may be produced through movement of arm 27 only by bringing the wheels 11 into vertical planes parallel with the frame of the vehicle.

Clutch sleeves 58 and 59, similar to sleeves 47 and 48, coöperate with the clutch hub 38 adjacent the other end of shaft 30 and are controlled by forks 60 and 61 fast on a block 62 which is connected by a link 63 with the lower end 64 of a lever 65 operating on the same lever stand as lever 57. By means of lever 65 the clutch sleeves 58 and 59 may, in similar manner to sleeves 47 and 48, be alternately clutched to clutch hub 38 when, and only when, the wheels 12 extend in vertical planes parallel with the frame of the vehicle.

It will be apparent that by these means either or both of the clutch hubs 28 and 38 may be clutched to rotate with shaft 30 or to be held rigid with the frame through hangers 31 or 32.

The shaft 30 is the steering shaft of the vehicle and is adapted to be rotated by hand-wheel 66, of usual type, having on its shaft 67 a worm 68 meshing with a worm wheel 69 fast on the shaft 30. When the steering wheel 66 is turned the shaft 30 is turned, and if both of the clutch hubs 28 and 38 are clutched to turn therewith, such hubs will, through the arms 27 and 37 and the connecting links 25 and 35, actuate the steering knuckles to oscillate the two sets of wheels in opposite directions and thus furnish a four-wheel steering mechanism. When either set of wheels is clutched to and parallel with the frame the other set of wheels will be oscillated by the steering shaft as desired to steer the vehicle.

The advantages of our invention are apparent and have been in the main given in connection with the description thereof. A four-wheel steering device is undoubtedly of great value where heavy loads are being handled, especially on wet or sandy roads or wet pavements. The response to steering actuations is much quicker. There is little injurious side draft on the tires, much shorter turns can be safely and rapidly made. But where a vehicle is drawn up close to the curb the four-wheel steering device is disadvantageous because the rear wheels are turned in toward the curb. At such a time, where our invention is employed, the rear wheels can be locked and the vehicle turned away from the curb in the usual way. It is also true that when a four-wheel steering device is used and the wheels are in a rut, an attempt to get out of the rut is dangerous because the vehicle will be turned too much and tend to jump around sidewise at the moment of leaving the rut. Under such circumstances where our invention is employed, the rear wheels may be locked and the vehicle steered with safety. Another object of our invention is that either end of a truck may be used with equal facility as the front end, whether all four wheels are used in steering or only that pair of wheels which is at the end used for the front. This is of marked value in connection with army truck service, where it is frequently not only desirable, but necessary, that the truck shall be moved frequently and for considerable distances in both directions without turning around.

The embodiment of our invention herein shown has been found to be efficient and satisfactory for the purpose, but we are aware that other constructions may be employed without departing from the scope or spirit of our invention and we do not wish to be limited to the exact construction herein shown.

We claim:

1. A vehicle supported by two pairs of wheels each pair being mounted and connected for steering movements in unison, a shaft, means to operate the shaft, means for operating each pair of wheels, and means for selectively clutching either or both of said operating means to the shaft.

2. A vehicle supported by two pairs of wheels each pair being mounted and connected for steering movements in unison, a shaft, means to operate the shaft, means for operating each pair of wheels, means for selectively clutching either or both of said operating means to the shaft, and means for clutching either of said operating means to hold either pair of said wheels locked parallel with the frame.

3. A vehicle having a pair of wheels mounted and connected for steering movements in unison, a shaft, means for rotating said shaft, a hub loose on said shaft having operative connection with the wheels, a part rigid with the frame, and means for connecting and disconnecting said sleeve with said rigid part to hold the wheels locked parallel with the frame.

4. A vehicle having a pair of wheels mounted and connected for steering movements in unison, a shaft, means for rotating said shaft, a hub loose on said shaft having operative connection with the wheels, a member rigid with the frame, and hand-controlled means for connecting or disconnecting the sleeve from the shaft and for simultaneously disconnecting or connecting the sleeve with the rigid member to cause the wheels to be operated by the shaft for steering the vehicle or to be held parallel with the frame as desired.

5. A vehicle having a pair of wheels mounted and connected for steering movements in unison, a shaft, means for rotating said shaft, a hub loose on said shaft having operative connection with the wheels, a member fast on the shaft on one side of the hub, a member loose on the shaft and fast with the frame on the other side of the hub, clutch sleeves independently splined to said two members, and means for simultaneously moving one sleeve into and the other sleeve out of clutching engagement with said hub, or vice versa, to cause the hub to be operated by the shaft to actuate the steering wheels or to be clutched to the frame to hold the wheels parallel therewith.

6. A vehicle having a pair of wheels mounted and connected for steering movements in unison, a shaft, means for rotating said shaft, a hub loose on said shaft having operative connections with the wheels and being formed with clutch members at each side thereof, a clutch sleeve splined to the shaft on one side of the hub, a clutch sleeve splined to a rigid member on the other side of the hub, a double fork formed as a unitary member for simultaneously operating said clutch sleeves, and hand-controlled means for actuating the fork whereby the clutch hub may be connected to the shaft or connected to the rigid member to operate the steering wheels from the shaft or hold the wheels parallel with the frame as desired.

In testimony whereof we affix our signatures.

FRANK H. STEBBINS.
WILLIAM A. HOPKINS.